(12) United States Patent
Wipf et al.

(10) Patent No.: US 10,214,365 B2
(45) Date of Patent: Feb. 26, 2019

(54) CONVEYING ARRANGEMENT

(71) Applicant: Robert Bosch GmbH, Stuttgart (DE)

(72) Inventors: Alfred Wipf, Jestetten (DE); Heike Raatz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/576,883

(22) PCT Filed: May 19, 2016

(86) PCT No.: PCT/EP2016/061224
§ 371 (c)(1),
(2) Date: Nov. 27, 2017

(87) PCT Pub. No.: WO2016/188841
PCT Pub. Date: Dec. 1, 2016

(65) Prior Publication Data
US 2018/0148268 A1    May 31, 2018

(30) Foreign Application Priority Data

May 26, 2015   (DE) .................. 10 2015 209 610

(51) Int. Cl.
*B65G 47/22*        (2006.01)
*B65G 45/10*        (2006.01)
(Continued)

(52) U.S. Cl.
CPC ............. *B65G 45/10* (2013.01); *B65G 15/30* (2013.01); *B65G 35/04* (2013.01); *B65G 54/02* (2013.01);
(Continued)

(58) Field of Classification Search
CPC .................. B65G 35/04; B65G 54/02; B65G 2201/0202; B65G 2207/06; B65G 2207/26
(Continued)

(56) References Cited

U.S. PATENT DOCUMENTS

| 4,205,536 A | 6/1980 | Kasahara | |
| 2002/0113496 A1* | 8/2002 | Hollis, Jr. ............. | H02K 41/03 310/12.02 |

(Continued)

FOREIGN PATENT DOCUMENTS

| DE | 102007025822 | 12/2008 |
| EP | 3031755 | 6/2016 |

(Continued)

OTHER PUBLICATIONS

International Search Report for Application No. PCT/EP2016/061224 dated Aug. 3, 2016 (English Translation, 3 pages).

*Primary Examiner* — Gene O Crawford
*Assistant Examiner* — Lester Rushin, III
(74) *Attorney, Agent, or Firm* — Michael Best & Friedrich LLP

(57) ABSTRACT

The invention relates to a conveying arrangement comprising at least one mover (20) which has at least one magnet (19), preferably a permanent magnet, and cooperates with a drive surface (13) so that the mover (20) can be slidably and/or rotatably moved with respect to the drive surface (13) in at least two degrees of freedom, at least one protective device (40) being provided and arranged between the drive surface (13) and the mover (20).

21 Claims, 4 Drawing Sheets

(51) Int. Cl.
  *B65G 15/30* (2006.01)
  *B65G 35/04* (2006.01)
  *B65G 54/02* (2006.01)

(52) U.S. Cl.
  CPC .. *B65G 2201/0202* (2013.01); *B65G 2207/26* (2013.01)

(58) Field of Classification Search
  USPC .......................................................... 198/494
  See application file for complete search history.

(56) References Cited

U.S. PATENT DOCUMENTS

2003/0230941 A1  12/2003  Jacobs
2010/0175943 A1   7/2010  Bergmann

FOREIGN PATENT DOCUMENTS

| GB | 2228241 | 8/1990 | |
|----|---------|--------|---|
| WO | 2008116857 | 10/2008 | |
| WO | 2011138448 | 11/2011 | |
| WO | 2013059934 | 5/2013 | |
| WO | WO-2013059934 A1 * | 5/2013 | ............. H02K 21/24 |

\* cited by examiner

CONVEYING ARRANGEMENT

The invention proceeds from a transportation device.

A system for transporting containers between various stations, wherein the containers are received in container carriers, is already known from WO 2011/138448. The system comprises a control unit which controls the transportation of the container carriers, a transportation surface which is subdivided into sub-surfaces and on which the container carriers can be movably disposed, and propulsion means, wherein the propulsion means are actuated by the control unit. This system is distinguished by high flexibility such as required in particular for the transportation of specimen containers of a laboratory analysis system.

A combined surface element having a multiplicity of actuable converter elements is already known from DE 10 2007 025 822 A1. The electromagnetic force fields that are generated by the device serve for the controlled action of force for moving objects of corresponding design. The objects thus moved can be a transportation device which has a plurality of roller elements for carrying out in particular logistics tasks.

The invention is based on the object of further optimizing the transportation device of the generic type, particularly regarding its cleanability, in particular with a view to the use in hygienically sensitive sectors.

SUMMARY OF THE INVENTION

By contrast to the above, the device according to the invention has the advantage of being largely immune to contaminations. To this end, at least one protective device which is disposed between the propulsion surface and the mover is provided. The propulsion surface can then be reliably protected in mechanical terms. Tight sealing of the propulsion surface is performed, such as can be required for hygienic requirements in the pharmaceutical or foodstuffs industry. The safety device permits a positive separation of the machine side, or the stator (lubricated region), respectively, from the production room in which the movers are located. Thanks to this separation the production room, depending on the application, can be configured as a clean room, a sterile room, or so as to have a specific hygienic classification, such as is of great importance specifically for packaging machines for the pharmaceutical industry. Thanks to the protective device, installation works can be carried out in the stator-side machine region without opening the production room. The entire plant thus would no longer have to be stopped. Moreover, the protective device covers gaps which could be created in the assembly of propulsion surfaces of modular construction. On account thereof, the cleanability is improved. Breeding grounds for bacteria which can be formed in gaps are also minimized in the production room. The protective device moreover improves the cleanability of the device, said cleaning now being able to be performed in the so-called wash down method. The protective device moreover cushions vibrations and potential (operating) noises. Moreover, a detection of solid dirt deposits can be performed in a reliable manner in terms of the process. The maintenance costs are also accordingly low.

In one expedient refinement it is provided that the protective device is configured so as to be replaceable and/or movable, preferably as a movable belt. Non-metallic elements (crumbs, for example) that are located between the stator and the mover can be removed or transported away on account of the replaceable and/or movable protective device. In the case of a protective device which can be moved transversely to the transportation direction, for example, movers can be transferred out or in in a seamless manner during the operation, without the movers requiring special bearing surfaces. The movable protective device, quasi as an intermediate base at the edge of the planar propulsion, assumes the transportation of the movers. This is more cost-effective than providing further planar modules.

In one expedient refinement it is provided that the protective device is configured as a film or a plate. This design embodiment is cost-effective and permits the protective device to be replaced in a simple manner, specifically in the case of a film.

In one expedient refinement, at least one motion means is provided for moving the protective device. Replacing or cleaning of the protective device can thus be performed automatically or semi-automatically. The operating personnel can be further supported on account thereof.

In one expedient refinement, at least one fixing means, in particular at least one opening for exerting a negative pressure on the protective device, is provided in the region of the propulsion surface, the protective device being able to be fixed by way of said fixing means. Specifically a flexible protective device such as a film can thus be held in the defined position of said film, such that no folds or gaps which are susceptible to contamination can be created.

In one expedient refinement, at least one cleaning device is provided for cleaning the protective device. The protective device, once cleaning has been performed, can thus be re-used for a further production process.

In one expedient refinement, at least one roll on which one part of the protective device is rolled up is provided, while the other part of the protective device at least partially covers the propulsion surface. A rapid replacement of the protective device can thus be achieved in a space-saving manner, since the propulsion surface is covered by a new and clean portion of the protective device by simply unrolling the latter.

In one expedient refinement it is provided that the protective device is configured so as to be encircling. A continuously movable and re-usable cleaning concept can be implemented specifically in conjunction with a cleaning device.

In one expedient refinement it is provided that at least one mover comprises means for moving the protective device. Particularly expediently, at least one mover comprises at least one fixing means for fixing the protective device. The mover per se can thus initiate a relative movement of the protective device in relation to the propulsion surface, or the stator, respectively. Further motion means are thus no longer required. To this end, the mover fixes the protective device such that a movement of the mover causes the mentioned relative movement of the protective device.

In one expedient refinement it is provided that the protective device, in particular the surface thereof, contains a readily sterilizable material, preferably plastics, in particular polyetherimide and/or polyether ketone and/or polyether ether ketone. These materials are distinguished by a good cleanability and are specifically suitable for sterilizing by various methods. Said materials are thus particularly suitable for use in pharmaceuticals or foodstuffs packaging.

In one expedient refinement, a detection of adherent contaminations on the surface of the protective device is performed by monitoring a spacing between the mover and the propulsion surface. The cleaning requirement can be determined in a particularly simple manner without additional sensors or similar.

In one expedient refinement it is provided that the propulsion surface comprises at least one parking zone which is distinguished by means which can apply a comparatively low magnetic force to the mover. The propulsion surface particularly preferably comprises at least one parking zone having a separate protective device. On account thereof, the replacement of the protective device is enabled in a simple manner, since the movers can be moved to the parking region where said movers do not impede the changeover of the protective device. The movers in this region can moreover be easily removed from the propulsion surface for maintenance purposes or similar, for example.

BRIEF DESCRIPTION OF THE DRAWINGS

Exemplary embodiments of the device according to the invention are illustrated in the drawing and will be described in more detail hereunder.

In the drawing.

DETAILED DESCRIPTION

Figure 1:
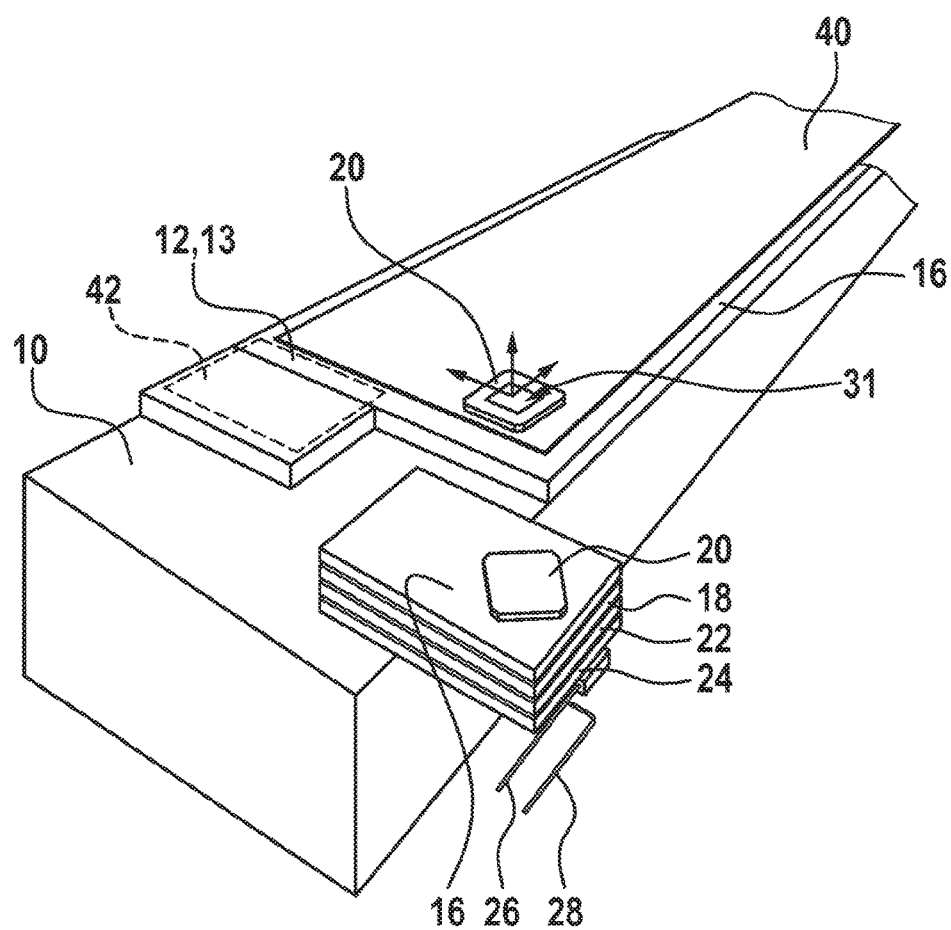
FIG. 1 shows an illustration of the system of the device.

A mover 20 having a rectangular basic shape is illustrated in the exemplary embodiment according to FIG. 1. A carrier plate 12, or a propulsion surface 13, respectively, is composed of a plurality of individual parts or tiles 16, respectively. The tiles 16 are configured so as to be square or rectangular, respectively. The tiles 16 have a substantially planar surface and are constructed in layers. The tile 16 thus comprises a coil plane 18, a sensor plane 22, and a power electronics plane 24. A bus system 26 which connects the tiles 16 to a central computer or processor, respectively, (neither shown) is furthermore provided. Moreover, a voltage supply 28 having associated connectors by way of which the power electronics plane 24 or the coil plane 18 and/or the sensor plane 22, respectively, can be provided with power is provided. A basic platform 10 defines the basic element, the latter being understood to be the systems carrier or a machine frame, respectively. The basic platform 10 can already receive control components and power electronics. Optionally, the carrier plate 12 or the propulsion surface 13, respectively, could also be a component part of the basic platform 10 itself. The movers 20 which are movable relative to the propulsion surface 13 are disposed on the surface of the basic platform 10 on the propulsion surface 13. To this end, the propulsion surface 13, or the carrier plate 12, respectively, generates a propulsion force which acts on the mover 20 and sets the latter in the desired motion. The stationary propulsion surface 13 is preferably embodied so as to be planar. The mover 20 is actuated such that said mover 20 is displaceable and/or rotatable in at least two degrees of freedom. Various positions can thus be approached in a flexible manner.

The mover 20 defines the movable element of the device. The mover 20 serves for generating a relative movement in relation to the carrier plate 12, or the propulsion surface 13, respectively, on the one hand. The mover 20 further generates a force in relation to the carrier plate 12, or the propulsion surface 13, respectively. To this end, the mover 20 comprises at least one means, in particular magnets, preferably a permanent magnet 19, for generating a magnetic field, said permanent magnet 19 interacting with coils 18 of the carrier plate 12, or of the propulsion surface 13, that generate a traveling field in order for a movement to be generated. An air gap is configured herein between the carrier plate 12, or the propulsion surface 13, respectively, and the mover 20 such that a non-contacting movement of the mover 20 relative to the propulsion surface 13 can be performed. The mover 20 can furthermore have means for identifying a position. A protective device 40 which can be placed over the propulsion surface 13 is indicated in FIG. 1. Furthermore, a parking zone 42 is plotted using dashed lines in the front region of the propulsion surface 13.

In order for the air gap of the mover to be kept constant, it is necessary for the magnetic field forces of the magnetic coils 18 that are covered temporarily by the movers 20 to be adapted individually and in a load-dependent manner. In order for the field to be regulated, Hall-effect sensors that are fixed to the frame can be provided for detecting the current air gaps. The current positions of the movers in the x-direction and the y-direction can preferably be determined in an absolute manner by suitable non-contacting linear measuring systems having a resolution of 0.01 mm and an extremely short cycle time. To this end, respective position sensors 22 can be provided in the tile 16.

Adherent contaminations on the stator surface can be identified by continuous measurement of the air gaps of the movers in a manner that is reliable in terms of the process in test runs at a low speed and with tilting torques that are as low as possible.

In order for the protective device 40 to be replaced, all movers 20 are repositioned to a parking zone 42 that is covered by an independent protective device strip that is not connected to the protective device 40. The protective device 40, with the negative pressure or vacuum switched off, can then be readily replaced. In order for the replacement of movers to be facilitated, and in order to reliably avoid the risk of crushing, the iron counterplates of the magnetic coils 18 that are fixed to the frame are configured so as to be considerably weaker in the region of the parking zone 42 than in the regions of the active propulsion surfaces 13.

Figure 2:
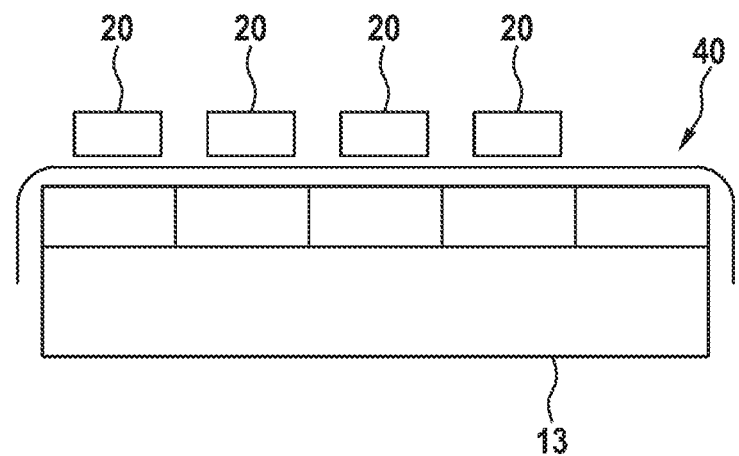
FIG. 2 shows a side view with a stationary protective device.

In the case of the exemplary embodiment according to FIG. 2, the protective device 40 covers the propulsion surface 13, or the stator, respectively. A fixed plate or a movable film is placed or clamped, respectively, as the protective device 40. The protective device 40 can be fixed or movable. A non-metallic and/or non-magnetic material is particularly suitable therefor. A sterilizable protective device 40, preferably a film, in particular of plastics, that is configured as a wearing part and is approximately 1 mm thick is provided for protecting the sensitive surface of the propulsion surface 13 (stator). The film can particularly preferably be composed of polyetherimide (PEI). In the case of a fixed configuration, the protective device 40 could be composed of a thin, non-corroding sheet-metal plate (non-magnetic). A thin plate could also be composed of polyether ketone (PEK, for short) or polyether ether ketone (PEEK), for example. With a view to usual sterilization methods, the material should also have a corresponding thermal resistance.

Figure 3:
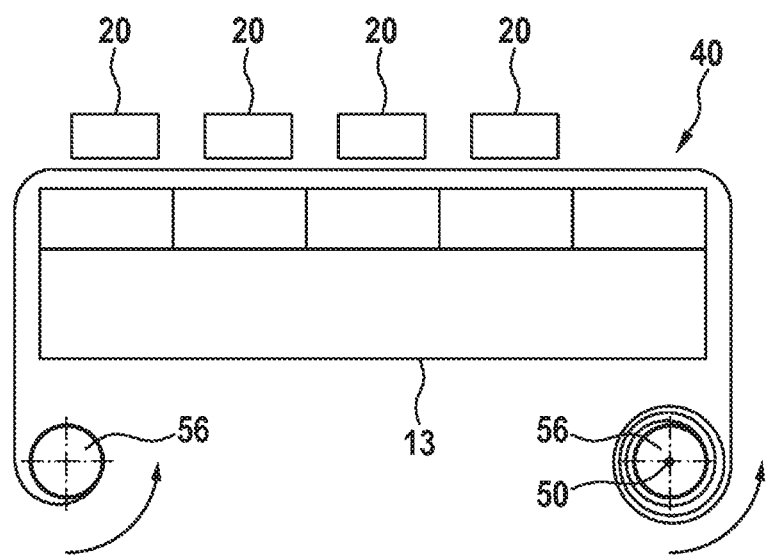
FIG. 3 shows a side view with a movable protective device.

The exemplary embodiment according to FIG. 3 is distinguished by a motion means 50 which can move the protective device 40. The flexible protective device 40 herein could be wound and unwound in conjunction with two rolls 56 that are disposed laterally. The motion means 50, like a usual, conventional drive, rotates at least one of the rolls 56 onto which the protective device 40 is then further rolled up. The protective means 40 thus moves in a manner parallel with the propulsion surface 13. Apart from protecting the stator or the propulsion surface 13, respectively, this serves in particular for removing dust contaminant particles.

In the case of the movable protective device 40, the latter can be moved over the stator surface or propulsion surface 13, respectively. The particles that are located on the protective device 40 are thereby removed from the stator surface. The movable protective device 40 in the case of a stopped machine can moreover be utilized for transporting the movers 20 from the machine, or to a dispensing opening, respectively. The machine operator thus advantageously does not need to have access to the entire transportation region. The movable protective device 40 can also be utilized for seamlessly infiltrating or exfiltrating individual or a plurality of movers 20 to and from the planar drive region.

The movable protective device 40 can be a wide transportation belt above which not only the magnetic movers 20 but also non-magnetic passive elements which are moved by the transportation belt, or can be shunted or displaced by the magnetic movers 20, respectively, are located. In the moved or the non-moved state, the stator surface is protected by the protective device 40 against mechanical stress. Moreover, said protective device 40 protects against dust as well as liquid and solid contamination.

Figure 4:
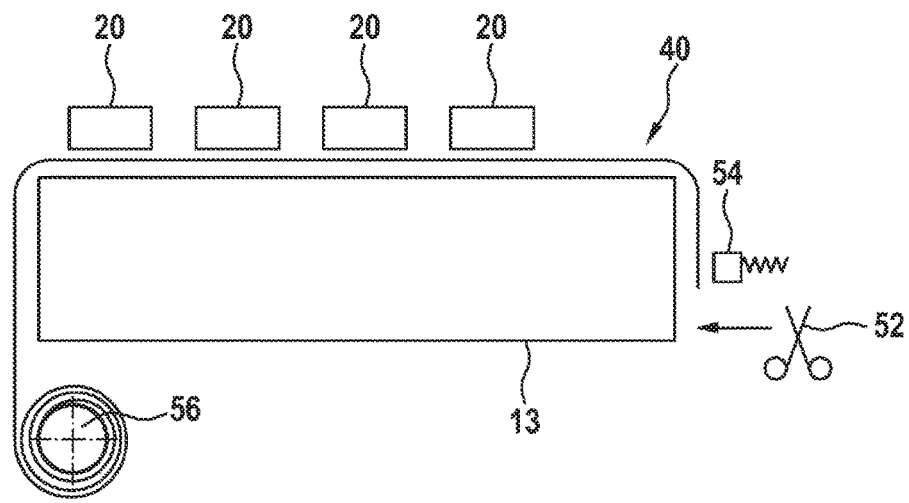
FIG. 4 shows a side view with a separable protective device.

The exemplary embodiment according to FIG. 4 comprises a movable protective device 40 which after a fixation feature 54 can at one end be severed by a cutting means 52. This serves in particular for removing a contaminated part of the protective device 40. In the ongoing operation, the fixation feature 54 prevents any slippage of the protective device 40.

Figure 5:
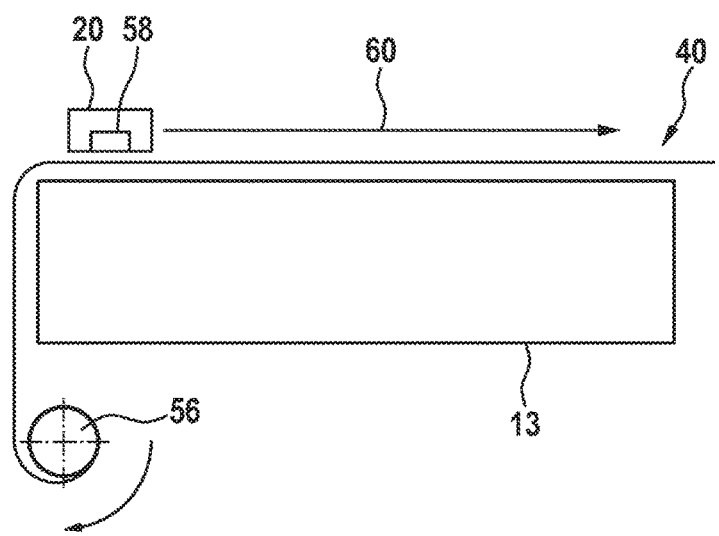
FIG. 5 shows a side view with a protective device that is movable by a mover.

In the exemplary embodiment according to FIG. 5, the protective device 40 again covers the stator, or the propulsion surface 13, respectively. For the purpose of replacing the contaminated protective device 40, the mover 20 can now handle the onward transportation of the protective device in the transportation direction 60. The mover 20 herein comprises at least one holding means 58 for fixing the protective device 40. The holding means 58, for example by suctioning or by a vacuum, respectively, magnetically or by clamping means, could establish a force-fitting and form-fitting connection with the protective device 40.

Figure 6:
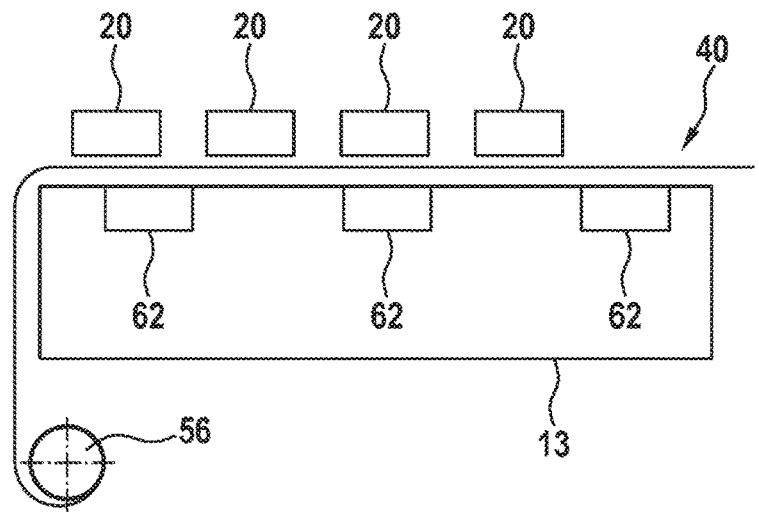
FIG. 6 shows a side view with fixing means for the protective device.

In the exemplary embodiment according to FIG. 6, at least one fixing feature 62 for the protective device 40 is provided in the region of the propulsion surface 13, or of the stator, respectively. This fixing feature 62 is preferably configured so as to be releasable in order to enable the protective device to be replaced. The fixing feature 62 could be operated by means of a vacuum, magnetically or mechanically (clamping, etc.). The protective device 40 can be suctioned to the surface of the propulsion surface 13 by way of minimal negative pressure. As is indicated in FIG. 6, vacuum openings, for example, serve as fixing means 62 in order for the protective device 40 in the ongoing operation to be fixed in an immovable manner but so as to nevertheless enable said protective device 40 to be replaced. Once the planar drive is switched off, the protective device 40 is fixed in an immovable manner by the conservative bearing forces of the movers 20.

Figure 7:
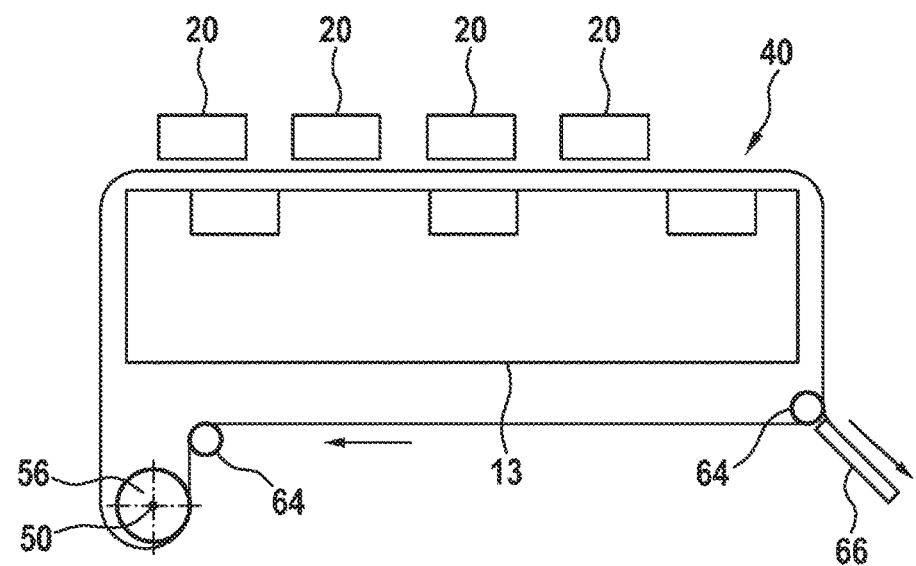
FIG. 7 shows a side view of an encircling protective device having a cleaning device.

The exemplary embodiment according to FIG. 7 is distinguished by an encircling protective device 40 which covers the upper side of the propulsion surface 13 and is returned to the other side below said propulsion surface 13. To this end, at least one motion means 50 and deflections 64 are provided. A cleaning device 66 which removes contamination from the surface of the protective device 40 is located laterally to the propulsion surface 13. The cleaned surface of the protective device 40 can subsequently be re-used for covering the propulsion surface 13.

The advantages of the stator sealing feature as described above can be summarized as follows. Contaminants on the protective device 40 are detected by monitoring the mover air gaps. Hermetically tight sealing of the propulsion surfaces 13 is performed. The protective device 40 is easily replaceable. Moreover, the propulsion surface is protected in mechanical terms. The protective device in the case of mechanical guides such as support rollers, by way of the ruts in the protective device 40 that are formed on account of initial plastic deformations, contributes toward an additional stabilizing effect of the movers 20. This forming process is completed after a relatively short running time, until a correspondingly increased support contribution of the support rollers has been reached. Vibrations and operational noise are attenuated.

The device is a component part of a flexible transportation system for various transportation applications, in particular in packaging technology of pharmaceuticals or foodstuffs, for example, for both solid as well as liquid products. However, the use is not limited thereto.

The invention claimed is:

1. A transportation device comprising at least one mover (20) which comprises at least one magnet (19), and which interacts with a propulsion surface (13) such that the mover (20) in relation to the propulsion surface (13) can be displaceably and/or rotatably moved in at least two degrees of freedom, and further comprising at least one protective device (40) which is disposed between the propulsion surface (13) and the mover (20), characterized in that at least one motion means (50) is provided for moving the protective device (40).

2. The device as claimed in claim 1, characterized in that the protective device (40) is configured so as to be replaceable and/or movable.

3. The device as claimed in claim 1, characterized in that the protective device (40) is configured as a film or a plate.

4. The device as claimed in claim 1, characterized in that at least one fixing means (62), including at least one opening for exerting a negative pressure on the protective device (40), is provided in the region of the propulsion surface (13), the protective device (40) being configured to be fixed by way of said fixing means (62).

5. The device as claimed in claim 1, characterized in that at least one cutting means (52) is provided for severing the protective device (40).

6. The device as claimed in claim 1, characterized in that at least one cleaning device (66) is provided for cleaning the protective device (40).

7. The device as claimed in claim 1, further comprising at least one roll (56) on which one part of the protective device (40) is rolled up, while an other part of the protective device (40) at least partially covers the propulsion surface (13).

8. The device as claimed in claim 1, characterized in that the protective device (40) is configured so as to be encircling.

9. A transportation device comprising at least one mover (20) which comprises at least one magnet (19), preferably a permanent magnet, and which interacts with a propulsion surface (13) such that the mover (20) in relation to the propulsion surface (13) can be displaceably and/or rotatably moved in at least two degrees of freedrom, and further comprising at least one protective device (40) which is disposed between the propulsion surface (13) and the mover characterized in that at least mover (20) comprises means for moving the protective device (40).

10. The device as claimed in claim 1, characterized in that at least one mover (20) comprises at least one fixing means (58) for fixing the protective device.

11. The device as claimed in claim 1, characterized in that the protective device (40), contains a readily sterilizable material .

12. The device as claimed in claim 1, further comprising means for detecting adherent contaminations on the surface of the protective device (40) by monitoring a spacing between the mover (20) and the propulsion surface (13).

13. The device as claimed in claim 1, characterized in that the propulsion surface (13) comprises at least one parking zone (42) including means for applying a comparatively low magnetic force to the mover (20).

14. The device as claimed in claim 1, characterized in that the propulsion surface (13) comprises at least one parking zone (42) which is not covered by the protective device (40).

15. The device as claimed in claim 1, characterized in that the at least one magnet (19) is a permanent magnet.

16. The device as claimed in claim 1, characterized in that the protective device (40) is a movable belt.

17. The device as claimed in claim 1, further comprising at least one opening for exerting a negative pressure on the protective device (40) in the region of the propulsion surface (13), the protective device (40) being configured to be fixed by way of said fixing means (62).

18. The device as claimed in claim 1, characterized in that a surface of the protective device (40) contains a readily sterilizable material.

19. The device as claimed in claim 1, characterized in that a surface of the protective device (40) contains polyetherimide and/or polyether ketones and/or polyether ether ketone.

20. A transportation device comprising at least one mover (20) which comprises at least one magnet (19), preferably a permanent magnet, and which interacts with a propulsion surface (13) such that the mover (20) in relation to the propulsion surface (13) can be displaceably and/or rotatably moved in at least two degrees of freedom, and further comprising at least one protective device (40) which is disposed between the propulsion surface (13) and the mover (20), characterized in that the protective device (40) is configured so as to be encircling.

21. A transportation device comprising at least one mover (20) which comprises at least one magnet (19), preferably a permanent magnet, and which interacts with a propulsion surface (13) such that the mover (20) in relation to the propulsion surface (13) can be displaceably and/or rotatably moved in at least two degrees of freedom, and further comprising at least one protective device (40) which is disposed between the propulsion surface (13) and the mover (20), characterized in that at least one cutting means (52) is provided for severing the protective device (40).

* * * * *